United States Patent
Bernas et al.

(10) Patent No.: US 7,112,050 B2
(45) Date of Patent: Sep. 26, 2006

(54) EXTRUSION DIE FOR MAKING A DOUBLE-SKIN HONEYCOMB SUBSTRATE

(75) Inventors: James J. Bernas, Horseheads, NY (US); Thomas W. Brew, Corning, NY (US); Rodney I. Frost, Corning, NY (US); Mark L. Humphrey, Corning, NY (US); Weiguo Miao, Corning, NY (US); Kenneth R. Miller, Addison, NY (US); Yawei Sun, Horseheads, NY (US); David R. Treacy, Jr., Elmira, NY (US); Sujanto Widjaja, Corning, NY (US)

(73) Assignee: Corning Incorporated, Corning, NY (US)

( * ) Notice: Subject to any disclaimer, the term of this patent is extended or adjusted under 35 U.S.C. 154(b) by 375 days.

(21) Appl. No.: 10/606,508

(22) Filed: Jun. 26, 2003

(65) Prior Publication Data

US 2004/0266619 A1   Dec. 30, 2004

(51) Int. Cl.
*B29C 47/12* (2006.01)

(52) U.S. Cl. ................. 425/190; 425/464; 425/467
(58) Field of Classification Search ............... 425/190, 425/380, 463, 464, 467; 264/177.12
See application file for complete search history.

(56) References Cited

U.S. PATENT DOCUMENTS

| | | | |
|---|---|---|---|
| 3,905,743 A | * 9/1975 | Bagley | 425/464 |
| 4,168,944 A | 9/1979 | Morikawa et al. | |
| 4,298,328 A | * 11/1981 | Frost | 425/380 |
| 4,915,612 A | * 4/1990 | Gangeme et al. | 425/464 |
| 5,089,203 A | * 2/1992 | Kragle | 264/177.11 |
| 5,256,054 A | * 10/1993 | Cocchetto et al. | 425/462 |
| 5,906,839 A | * 5/1999 | Miura et al. | 425/380 |
| 5,942,260 A | * 8/1999 | Kodama et al. | 425/190 |
| 5,952,079 A | 9/1999 | Andou et al. | |
| 6,287,103 B1 | * 9/2001 | Miyazaki | 425/131.1 |
| 6,455,124 B1 | * 9/2002 | Beall et al. | 428/116 |
| 6,854,969 B1 | * 2/2005 | Shibagaki et al. | 425/378.1 |

FOREIGN PATENT DOCUMENTS

| | | |
|---|---|---|
| EP | 0 241 269 | 11/1991 |
| EP | 0 867 222 | 6/2002 |
| EP | 0 867 223 | 2/2003 |
| JP | 55-147154 | 11/1998 |

\* cited by examiner

*Primary Examiner*—Joseph S. Del Sole
(74) *Attorney, Agent, or Firm*—Randall S. Wayland; Anca C. Gheorghiu

(57) ABSTRACT

A honeycomb substrate includes an inner body having an inner skin and an array of inner webs defining an array of inner cells within the inner skin. The honeycomb substrate further includes an outer body having an outer skin formed concentric with the inner skin and an array of outer webs defining an array of triangle cells between the inner skin and the outer skin. The triangle cells are oriented along a radial direction with respect to a center of the inner body. An extrusion assembly for forming the honeycomb substrate includes an inner cell forming die, an outer cell forming die, and a skin forming mask, all mounted coaxially. An outer skin slot formed between the outer cell forming die and the skin forming mask is in communication with feedholes in the inner cell forming die through an opening in the outer cell forming die.

16 Claims, 16 Drawing Sheets

EXTRUSION DIE FOR MAKING A DOUBLE-SKIN HONEYCOMB SUBSTRATE

BACKGROUND OF INVENTION

The invention relates generally to honeycomb substrates and particularly to a method of enhancing the isostatic strength of a honeycomb substrate having cells defined by thin webs.

Honeycomb substrates are widely used as catalyst carriers for purification of exhaust gases from internal combustion engines. A typical honeycomb substrate has a columnar body, the cross-sectional shape of which is typically round or oval. An array of parallel, straight channels is formed in the columnar body to allow passage of gases through the honeycomb substrate. The channels run axially along the length of the columnar body. The cross-section of the channels can be of any arbitrary shape, such as triangle, square, and hexagon. For automotive applications, the cross-section of the channels is frequently square because square channels are easier to manufacture. The channel walls may be coated with a porous washcoat containing an active catalyst. Alternatively, the active catalyst may be incorporated directly into the channel walls. In operation, exhaust gases flow into the channels and are converted into less noxious components in the presence of the active catalyst prior to exiting the honeycomb substrate. For illustration purposes, FIG. 1 shows a cross-section of a typical prior-art honeycomb substrate 100 having an array of square cells (or channels) 102 defined by an array of square webs (or cell walls) 104 and bounded by a skin (or peripheral wall) 106. Typically, the skin 106 has a circular or elliptical profile.

A honeycomb substrate is typically wrapped in a mat and inserted in a metal can prior to use in an automotive application. When the honeycomb substrate is inserted in a can, the forces required to restrain the honeycomb substrate within the can are uniformly distributed along the periphery of the honeycomb substrate, perpendicular to the skin of the honeycomb substrate. These forces have the greatest impact for the honeycomb substrate with square cells when applied at the 45° positions to the square webs, i.e., when applied in a direction along the diagonals of the square webs, as shown by the arrows in FIG. 1. When loaded at this angle, the webs cannot function as columns under compression, and the honeycomb substrate is less rigid. In this state, the webs are subjected to high deflections, which generate bending moments and undesirable tensile stresses in the honeycomb substrate. Typically, the honeycomb substrate is made of ceramic, a material that is inherently weak in tension. Hence, the tensile stress levels determine the strength of the canned ceramic honeycomb substrate.

In an effort to meet stringent automotive emission requirements, it has been necessary to reduce the thermal mass in the central region of the honeycomb substrate while increasing the geometric surface area and open frontal area of the honeycomb substrate. The thermal mass in the central region has been reduced and the geometric surface area has been increased by increasing the number of cells in the honeycomb substrate. At the same time, the thickness of the webs in the honeycomb substrate has been significantly reduced to increase the open frontal area of the honeycomb substrate and limit the back-pressure in the honeycomb substrate to an acceptable limit. Although reduction in web thickness has improved emissions performance, it has also resulted in marked reduction in the isostatic strength of the honeycomb substrate, making the honeycomb substrate more susceptible to damage during canning and lowering the thermal and mechanical durability of the honeycomb substrate in the application.

Various methods have been proposed for improving the isostatic strength of ceramic honeycomb substrates with thin webs. Some of these methods include increasing the cell density at a region near the periphery of the honeycomb substrate, thickening the webs at a region near the periphery of the honeycomb substrate, and using additives to strengthen the skin of the honeycomb substrate. One approach to increasing the cell density near the periphery of the honeycomb substrate involves subdividing the square cells near the periphery of the honeycomb substrate into smaller square cells or triangle cells. One method for increasing the thickness of the webs near the periphery of the honeycomb substrate includes rounding the square cells near the periphery of the honeycomb substrate. While these approaches can improve the isostatic strength of the honeycomb substrate, they can also yield undesirable results such as increase in pressure loss across the honeycomb substrate and/or reduction in thermal shock strength of the honeycomb substrate.

From the foregoing, there is desired a method of increasing the isostatic strength of a honeycomb substrate in all directions without adversely impacting the performance of the honeycomb substrate.

SUMMARY OF INVENTION

In one aspect, the invention relates to a honeycomb substrate which comprises an inner body having an inner skin and an array of inner webs defining an array of inner cells within the inner skin. The honeycomb substrate further comprises an outer body having an outer skin formed concentric with the inner skin and an array of outer webs defining an array of radially-oriented triangle cells between the inner skin and the outer skin. In one embodiment, the array of triangle cells comprises an array of radially-oriented diamond cells.

In another aspect, the invention relates to a honeycomb substrate which comprises an inner body having an inner skin and an array of inner webs defining an array of inner cells within the inner skin. The honeycomb substrate further comprises an outer body having an outer skin formed concentric with the inner skin and an array of outer webs defining an array of radially-oriented quadrilateral cells between the inner skin and the outer skin. The quadrilateral cells have a length along a circumferential direction that is no greater than a length of the inner cells.

In another aspect, the invention relates to a honeycomb substrate which comprises an inner body having an inner skin and an array of inner webs defining an array of inner cells within the inner skin. The honeycomb substrate further comprises an outer body having an outer skin formed concentric with the inner skin and an array of first outer webs arranged parallel to a diametrical axis of the inner body and an array of second outer webs arranged in a crisscross pattern. The first and second outer webs intersect to define an array of triangle cells between the inner skin and the outer skin.

In another aspect, the invention relates to an extrusion die assembly for making a double-skin honeycomb substrate which comprises an inner cell forming die having a central region and a peripheral region. The central region comprises an array of inner slots cut to define an array of inner pins and an array of central feedholes in communication with the array of inner slots. The peripheral region comprises an array of peripheral feedholes. The extrusion die assembly further includes a skin forming mask mounted coaxially with the inner cell forming die. The extrusion die assembly further includes at least one outer cell forming die mounted coaxially with and interposed between the inner cell forming die and the skin forming mask. The outer cell forming die has an array of outer slots cut to define an array of outer pins. The outer pins are spaced radially from the central region to define an inner skin slot and spaced radially from the skin forming mask to define an outer skin slot. The inner skin slot is in selective communication with the array of peripheral feedholes. The outer skin slot is in selective communication with the peripheral feedholes through an opening in the outer cell forming die.

Other features and advantages of the invention will be apparent from the following description and the appended claims.

DETAILED DESCRIPTION OF PREFERRED EMBODIMENTS

The invention will now be described in detail with reference to a few preferred embodiments, as illustrated in the accompanying drawings. In the following description, numerous specific details are set forth in order to provide a thorough understanding of the invention. It will be apparent, however, to one skilled in the art, that the invention may be practiced without some or all of these specific details. In other instances, well-known features and/or process steps have not been described in detail in order to not unnecessarily obscure the invention. The features and advantages of the invention may be better understood with reference to the drawings and discussions that follow.

While not wishing to be bound by theory, the inventors believe herein that the isostatic strength of a honeycomb substrate can be enhanced by incorporating reinforcing webs near the periphery of the honeycomb substrate. The inventors propose a double-skin structure whereby the reinforcing webs are arranged between at least two concentric skins near the periphery of the honeycomb substrate and are separated from the central region of the honeycomb substrate by the concentric skins. This allows the central region, which contains the main flow channels, to be optimized independently of the reinforcing webs to achieve a desired performance for a target application. The geometry and orientation of the reinforcing webs can be selected to achieve desired isostatic strength without significantly impacting the performance of the honeycomb substrate. The inventors believe herein that the geometry and orientation of the reinforcing webs are important to achieving enhanced isostatic strength in all directions along the periphery of the honeycomb substrate.

Figure 1:
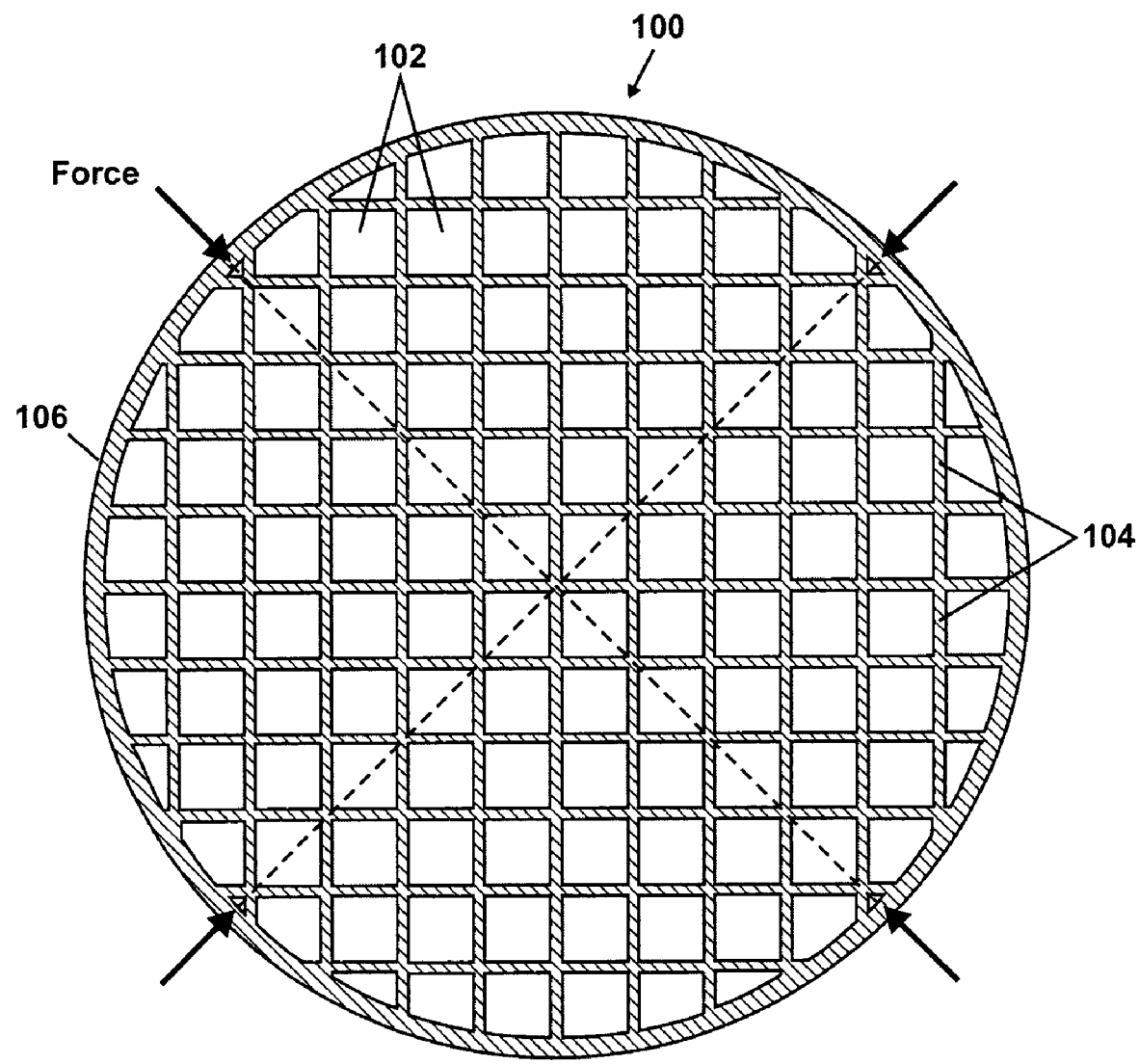
FIG. 1 is a cross-section of a prior-art honeycomb substrate having an array of square cells.
Figure 2A:
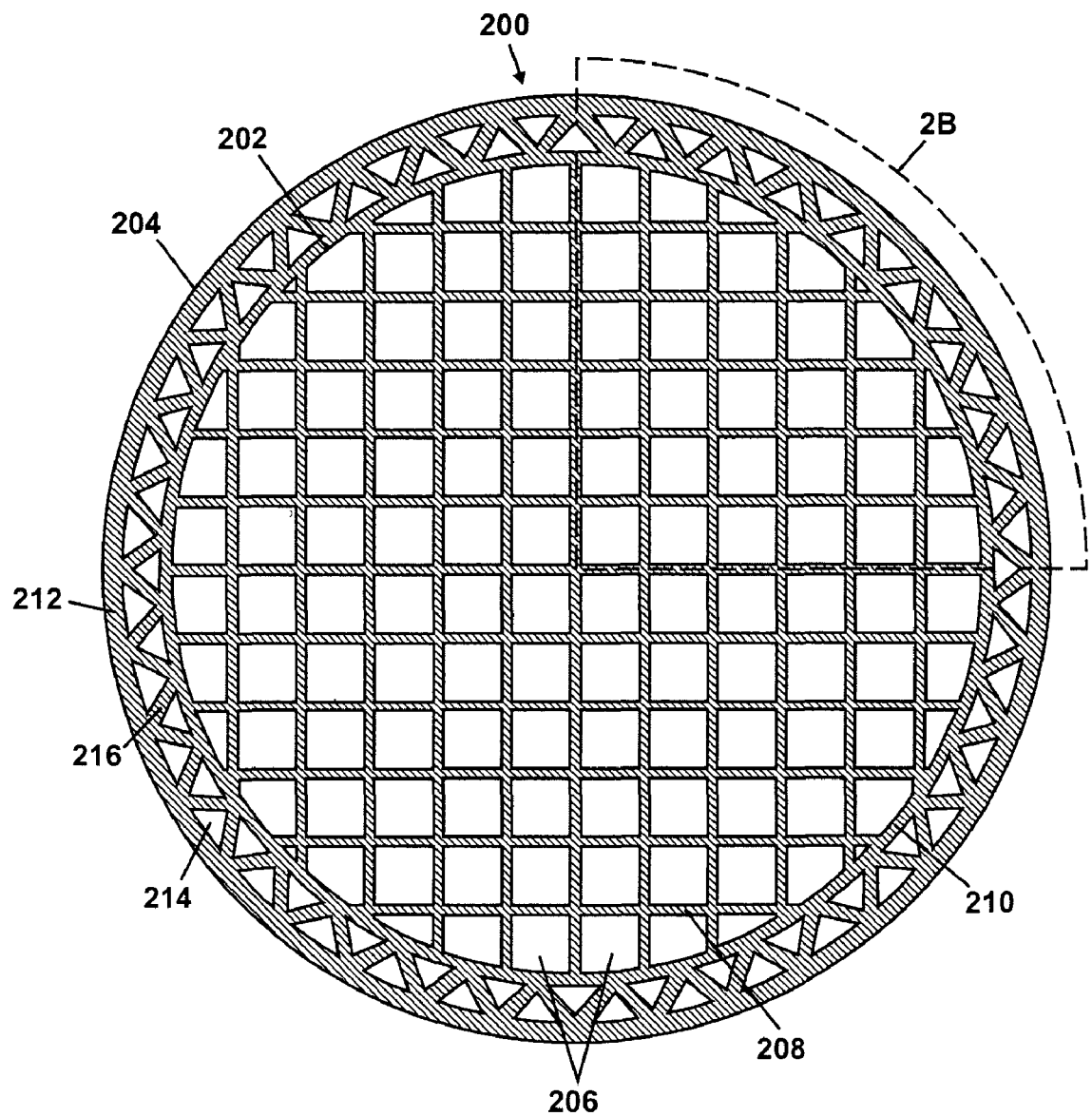
FIG. 2A is a cross-section of a double-skin honeycomb substrate having a single layer of radially-oriented triangle cells formed between concentric skins at the periphery of the honeycomb substrate according to one embodiment of the invention.

For illustration purposes, FIG. 2A shows a double-skin honeycomb substrate 200 according to one embodiment of the invention. The double-skin honeycomb substrate 200 includes an inner honeycomb body 202 and an outer honeycomb body 204. The inner and outer honeycomb bodies 202, 204 are columnar and are typically made of a ceramic material, such as cordierite, but could also be made of other extrudable materials, such as glass, glass-ceramics, and plastic. The structure of the inner honeycomb body 202 may be optimized for a specific application, such as an automotive emissions application. The structure of the outer honeycomb body 204 is preferably designed to enhance the isostatic strength of the honeycomb substrate 200 in all directions along the periphery of the substrate. The structure of the outer honeycomb body 204 can be optimized independently of the structure of the inner honeycomb body 204. This means that the isostatic strength of the honeycomb substrate 200 can be enhanced without significantly impacting the performance of the honeycomb substrate 200, which would typically depend primarily on the structure of the inner honeycomb body 202.

The inner honeycomb body 202 has an array of (inner) cells 206 defined by an array of (inner) webs 208 and an (inner) skin 210. The cross-sectional shape of the honeycomb body 202 can be round, oval, or other appropriate shape for the target application. The cross-section of the inner cells 206 can be of any arbitrary shape, such as triangle, square, and hexagon. In the illustration, the cross-section of the inner cells 206 is shown as square. As previously mentioned, a square geometry is frequently used in automotive exhaust gas purification systems. Further, the invention provides significant advantages in terms of strength enhancement when used with a square geometry. The inner skin 210 has a circular profile in the illustration. In alternate embodiments, the inner skin 210 may have an elliptical or other profile appropriate for the target application. The dimensions of the inner cells 206 and inner webs 208 can be selected to achieve a desired emissions performance or can be optimized for other applications. The invention provides advantages in terms of strength enhancement when the inner webs 208 are very thin, e.g., less than or equal to 0.15 mm in thickness.

Figure 2B:
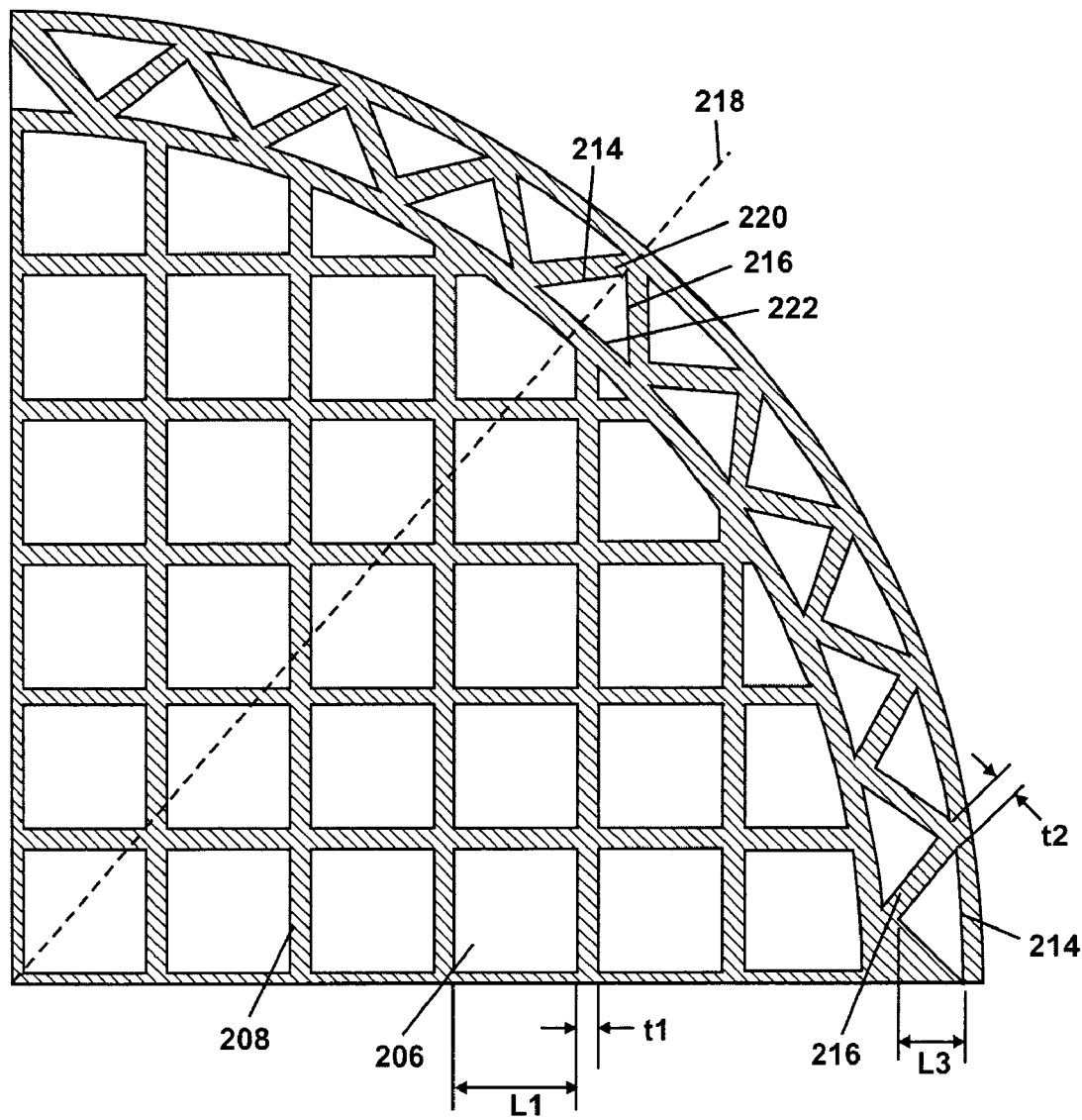
FIG. 2B is an enlargement of a section of the double-skin honeycomb substrate shown in FIG. 2A.

The outer honeycomb body 204 includes an (outer) skin 212 formed concentric with the inner skin 210 and a layer of (outer) cells 214 defined by (outer) webs 216. The outer webs 216 form a bridge between the inner skin 210 and the outer skin 212. The outer cells 214 have a triangle cross-section. The term "triangle" is intended to cover triangular-like shapes where one or more sides of the triangle have a curvature and/or one or more corners of the triangle include fillets. The triangle could be isosceles, including equilateral, or scalene, or right-angle. The outer cells 214 are radially-oriented with respect to the center of the inner honeycomb body 202. The term "radially-oriented" means that a major dimension of the outer cell 214 lies along a radial line drawn outwardly from the center of the inner honeycomb body 202. For a triangle cell, this major dimension could be the altitude of the cell. As illustrated in FIG. 2B, a radial line 218 drawn from the center of the inner honeycomb body 202 to the vertex 220 of a triangle cell 214 perpendicularly intersects the side (or base) 222 of the triangle cell 214 opposite the vertex 220 of the triangle cell 214.

Returning to FIG. 2A, the outer cells 214 are uniformly distributed along the inner and outer skins 210, 212 so that a load applied perpendicularly to the outer skin 212 is uniformly distributed to the inner skin 210 via the outer webs 216. When a load is applied to the outer skin 212, the outer webs 216 act as columns under compression, which makes the honeycomb substrate 200 very rigid. In one embodiment, the geometry of the outer webs 216 is selected such that the applied load does not result in high deflections that can generate bending moments and undesirable tensile stresses in the honeycomb substrate 200. In particular, the outer webs 216 act to reduce the loads at the 45° positions of the inner honeycomb body 202 where, for a square cell matrix, the tensile loads and, consequently, the probability of failure are highest.

In general, design of the outer honeycomb body 204 would depend on the target application and the desired isostatic strength. The geometric variables may include density of the outer cells 214, geometry of the outer cells 214, thickness of the outer webs 216, number of layers of outer cells 214 formed between the inner and outer skins 210, 212, gradations in outer cell density and/or outer web thickness, thickness of the inner and outer skins 210, 212 as well as any intermediate skin formed between stacked layers of outer webs. These geometric variables can be selected to give an appropriate balance between isostatic strength, thermal mass, and chip resistance. For uniform flow, the dimensions of the outer cells 214 can be selected such that the outer cells 214 have equivalent hydraulic diameter to the inner cells 206. Fillets (not shown) may be formed at the intersections between the outer webs 216 and the outer skin 212. Concave fillets are desirable for reducing stress concentration. However, convex fillets may also be used to improve adherence of the outer webs 216 to the outer skin 212. In one embodiment, the radius of the fillets could range from 0.05 to 0.2 mm, depending on the dimensions of the outer webs and outer skin. The following design constraints have been found to provide desirable results under a uniform pressure loading of 1 MPa:

$$0.1 \cdot L1 \leq L3 \leq 2 \cdot L1 \qquad (1)$$

and/or $$t2 \geq 0.5 \cdot t1 \qquad (2)$$

where, as illustrated in FIG. 2B, L1 is the length of the square cell 206, L3 is the length (or altitude) of the triangle cell 214 in the radial direction, t1 is the thickness of the square web 208, and t2 is the thickness of the triangle web 216.

Figure 3:
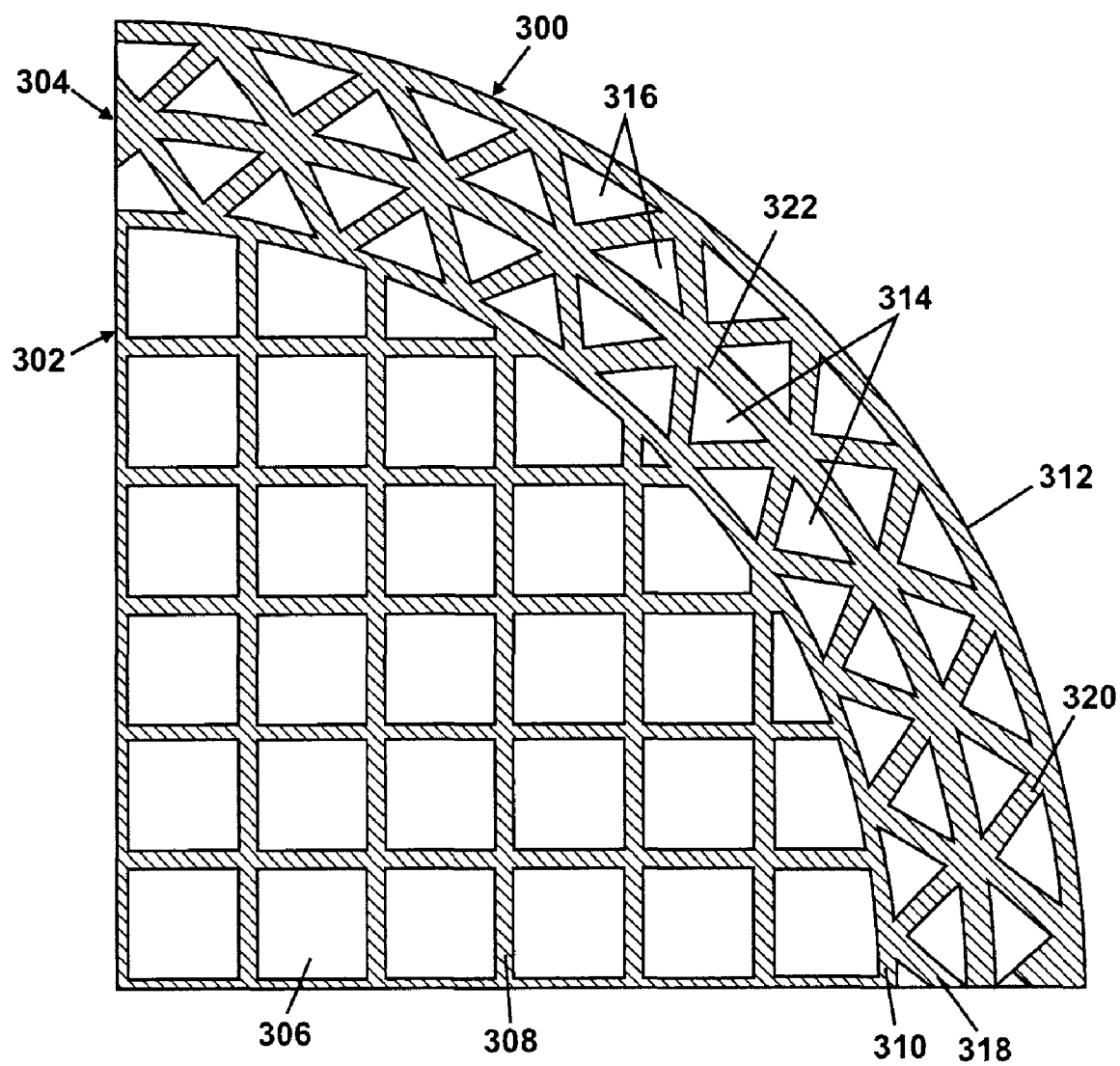
FIG. 3 is a cross-section of a double-skin honeycomb substrate having two layers of radially-oriented triangle cells formed between concentric skins at the periphery of the honeycomb substrate according to another embodiment of the invention.

FIG. 3 shows a quarter cross-section of a double-skin honeycomb substrate 300 according to another embodiment of the invention. The honeycomb substrate 300 includes an inner honeycomb body 302 and an outer honeycomb body 304. In one embodiment, the inner honeycomb body 302 includes square cells 306 defined by square webs 308 and bounded by an inner skin 310. The outer honeycomb body 304 includes an outer skin 312 and two layers of triangle cells 314, 316 formed between the inner skin 310 and outer skin 312. The triangle cells 314 are defined by triangle webs 318, and the triangle cells 316 are defined by triangle webs 320. An intermediate skin 322 is formed between the layers of triangle cells 314 and 316. The intermediate skin 322 is concentric with the inner skin 310 and the outer skin 312. The triangle cells 314, 316 are radially oriented with respect to the center of the inner honeycomb body 302. Further, the triangle cells 314, 316 are uniformly distributed along the periphery of the inner honeycomb body 302 so that a load applied perpendicular to the outer skin 312 is uniformly distributed to the inner skin 310 and the inner square webs 308 via the outer triangle webs 318, 320 and intermediate skin 322.

The sizes and thicknesses of the triangle cells 314, 316 and triangle webs 318, 320 can be selected to provide the desired isostatic strength. As an example, desirable results have been achieved under a uniform pressure loading of 1 MPa when the lengths (or altitudes) of the triangle cells 314, 316 along the radial direction are in a range from 0.1 to 2 times the length of the square cell 306 and/or when the thicknesses of the triangle webs 318, 320 are in a range from 0.1 to 4 times the thickness of the square web 308. It should be noted that the geometry of the triangle webs 320 and cells 316 can be different from or the same as the geometry of the triangle webs 318 and cells 314. Further, the outer honeycomb body 304 can have more than two layers of triangle cells/webs. Further, the thicknesses of the interface skin 322 and outer skin 312 can be varied as necessary to achieve desired balance between isostatic strength, thermal mass, and chip resistance. Further, the intersections between the triangle webs 320 and the outer skin 312 can be filleted to either reduce stress concentration at the intersections or improve adherence of the triangle webs to the outer skin. In one embodiment, the radius of the fillets could range from 0.05 to 0.2 mm, depending on the dimensions of the triangle webs and the outer skin.

Figure 4:
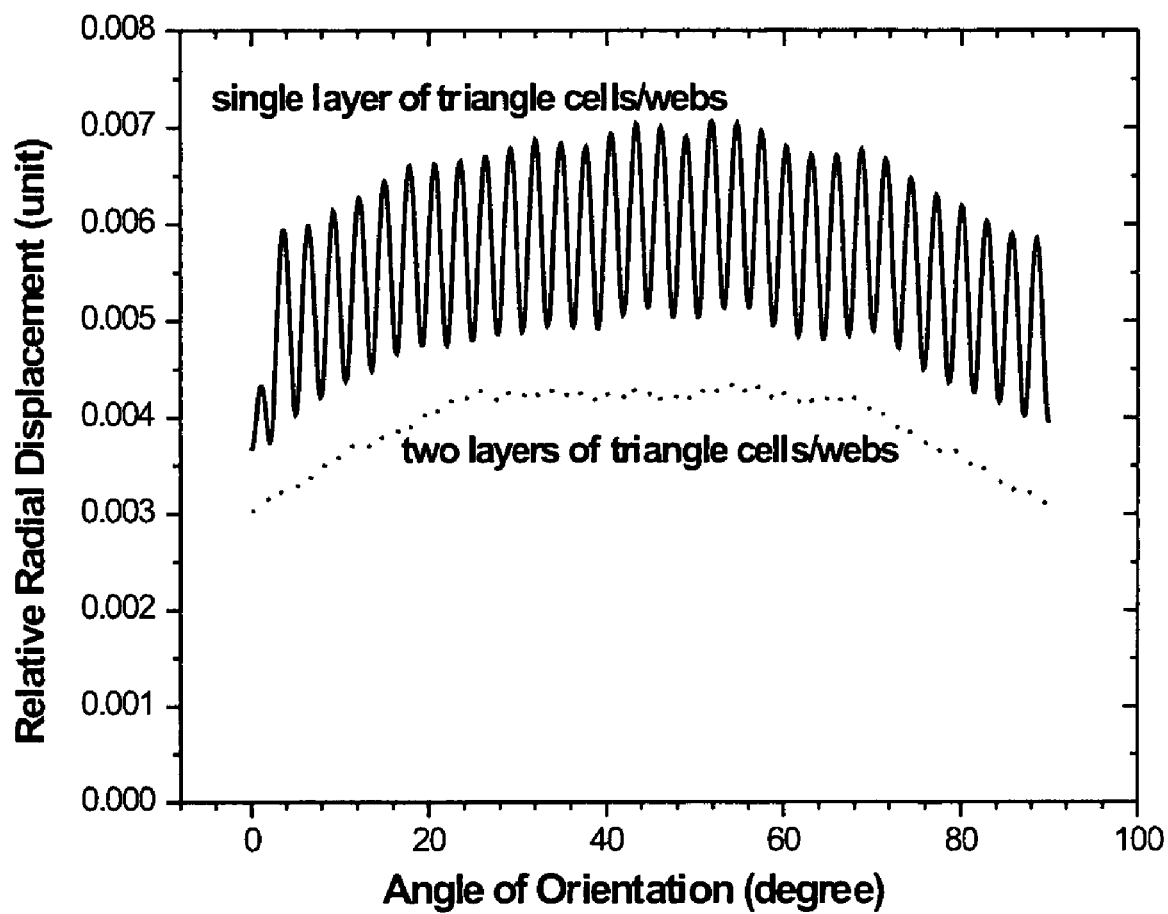
FIG. 4 is a graph showing relative comparison between radial displacement for a double-skin honeycomb substrate having a single layer of radially-oriented triangle cells formed between concentric skins and a double-skin honeycomb substrate having two layers of radially-oriented triangle cells formed between concentric skins in response to uniformly applied pressure.

A honeycomb substrate structure having a double layer of triangle cells/webs (shown in FIG. 3) is expected to have higher isostatic strength than a honeycomb substrate having a single layer of triangle cells/webs (shown in FIGS. 2A and 2B). In general, the higher the number of layers of triangle cells/webs incorporated at the periphery of the honeycomb substrate, the better the isostatic strength of the honeycomb substrate. FIG. 4 compares the relative radial displacement of the outer skin of the outer honeycomb body under 1-MPa uniform pressure loading for a single layer of triangle cells/webs and a double layer of triangle cells/webs. FIG. 4 shows that the double layer of triangle cells/webs can better absorb radial displacement than the single layer of triangle cells/webs, distributing the applied load to the elastic matrix cells. The results show that a double layer of triangle cells can lower radial displacement by about 15% in comparison to a single layer of triangle cells/webs.

Figure 5:
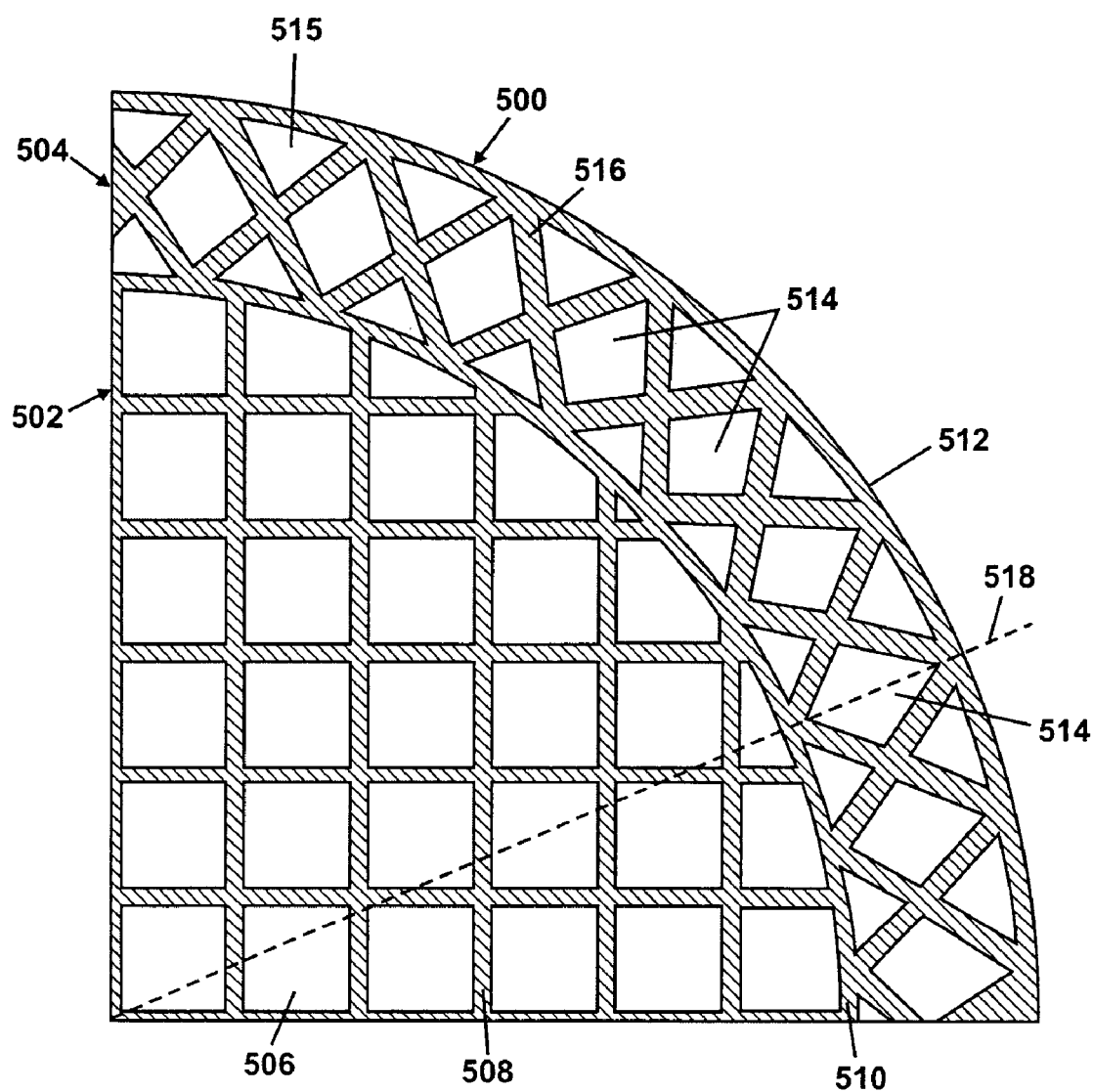
FIG. 5 is a cross-section of a double-skin honeycomb substrate having a single layer of radially-oriented diamond and triangle cells formed between concentric skins at the periphery of the honeycomb substrate according to another embodiment of the invention.

FIG. 5 shows a quarter cross-section of a double-skin honeycomb substrate 500 according to another embodiment of the invention. The honeycomb substrate includes an inner honeycomb body 502 and an outer honeycomb body 504. In one embodiment, the inner honeycomb body 502 includes inner square cells 506 defined by inner square webs 508 and an inner skin 510. The outer honeycomb body 504 includes an outer skin 512 and outer diamond cells 514 and triangle cells 515 defined by outer diamond webs 516. The diamond cells 514 and triangle cells 515 are radially oriented with respect to the center of the inner monolith body 502. In the case of the diamond cell 514, a radial line 518 drawn from the center of the inner honeycomb body 504 through a diamond cell 514 would pass through opposite vertices of the diamond cell 514. It should be noted that the term "diamond" is intended to encompass diamond-like shapes in which the four sides of the diamond are not equal. For ease of manufacturing, it is desirable that each side of the diamond cell is generally parallel to a side of an adjacent triangle cell. The single layer of diamond and triangle cells 514, 515 and diamond webs 516 offer a benefit similar to the double layer of triangle cells/webs shown in FIG. 3. Further, the diamond and triangle cell structure may be easier to manufacture since it does not require the intermediate skin (322 in FIG. 3) used with the double layer of triangle cells/webs. The angles and thicknesses of the diamond webs 516 can be selected to achieve the desired isostatic strength. Further, two or more layers of diamond and triangle cells 514, 515 can be used to further enhance the isostatic strength of the honeycomb substrate. The intersections between the diamond webs 516 and the outer skin 512 can be filleted to either reduce stress concentration at the intersections or improve adherence of the diamond webs to the outer skin. In one embodiment, the radius of the fillets could range from 0.05 to 0.2 mm, depending on the dimensions of the diamond webs and the outer skin.

Figure 6A:
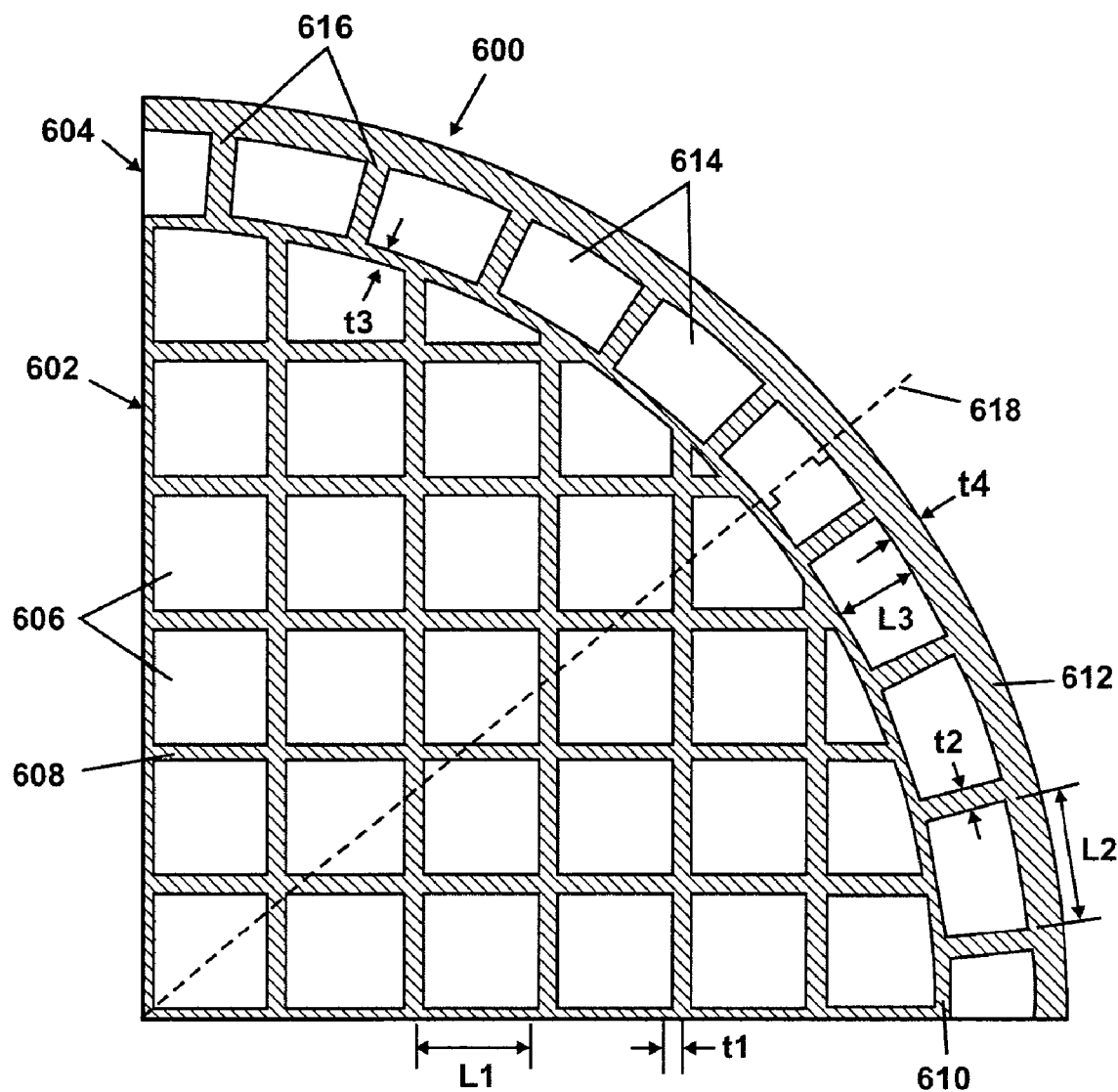
FIG. 6A is a quarter cross-section of a double-skin honeycomb substrate having a single layer of radially-oriented quadrilateral cells formed between concentric skins at the periphery of the honeycomb substrate according to another embodiment of the invention.

FIG. 6A shows a quarter cross-section of a honeycomb substrate 600 according to another embodiment of the invention. The honeycomb substrate 600 includes an inner honeycomb body 602 and an outer honeycomb body 604. In one embodiment, the inner honeycomb body 602 includes square cells 606 defined by square webs 608 and bounded by an inner skin 610. The outer honeycomb body 604 includes an outer skin 612 and quadrilateral cells 614 defined by straight webs 616. The quadrilateral cells 614 are radially oriented with respect to the center of the inner monolith body 602, i.e., a radial line 618 drawn from the center of the inner monolith body 602 through a quadrilateral cell 614 perpendicularly bisects opposite sides of the quadrilateral cell 614. The term "quadrilateral" is intended to encompass shapes where one or more sides of the quadrilateral have a curvature, such as shown in FIG. 6A.

The geometry and spacing of the quadrilateral cells 614 and straight webs 616 can be selected to provide the desired isostatic strength. The following conditions have been found to provide desirable results under a uniform pressure loading of 1 MPa:

$$0.5 \cdot L1 \leq L2 \leq L1 \tag{3}$$

$$0.1 \cdot L1 \leq L3 \leq 2 \cdot L1 \tag{4}$$

$$t3 \geq t1 \tag{5}$$

$$t4 \geq 2 \cdot t1 \tag{6}$$

$$t3 > 0.25 \cdot t2 \tag{7}$$

$$t4 > t2 \tag{8}$$

where L1 is the length of the square cell 606, L2 is the length of the quadrilateral cell 614 along the circumferential direction of the substrate, L3 is the length of the quadrilateral cell 614 along the radial direction of the substrate, t1 is the thickness of the square cell 606, t2 is the thickness of the straight web 616, t3 is the thickness of the inner skin 610, t4 is the thickness of the outer skin 612.

Figure 6B:
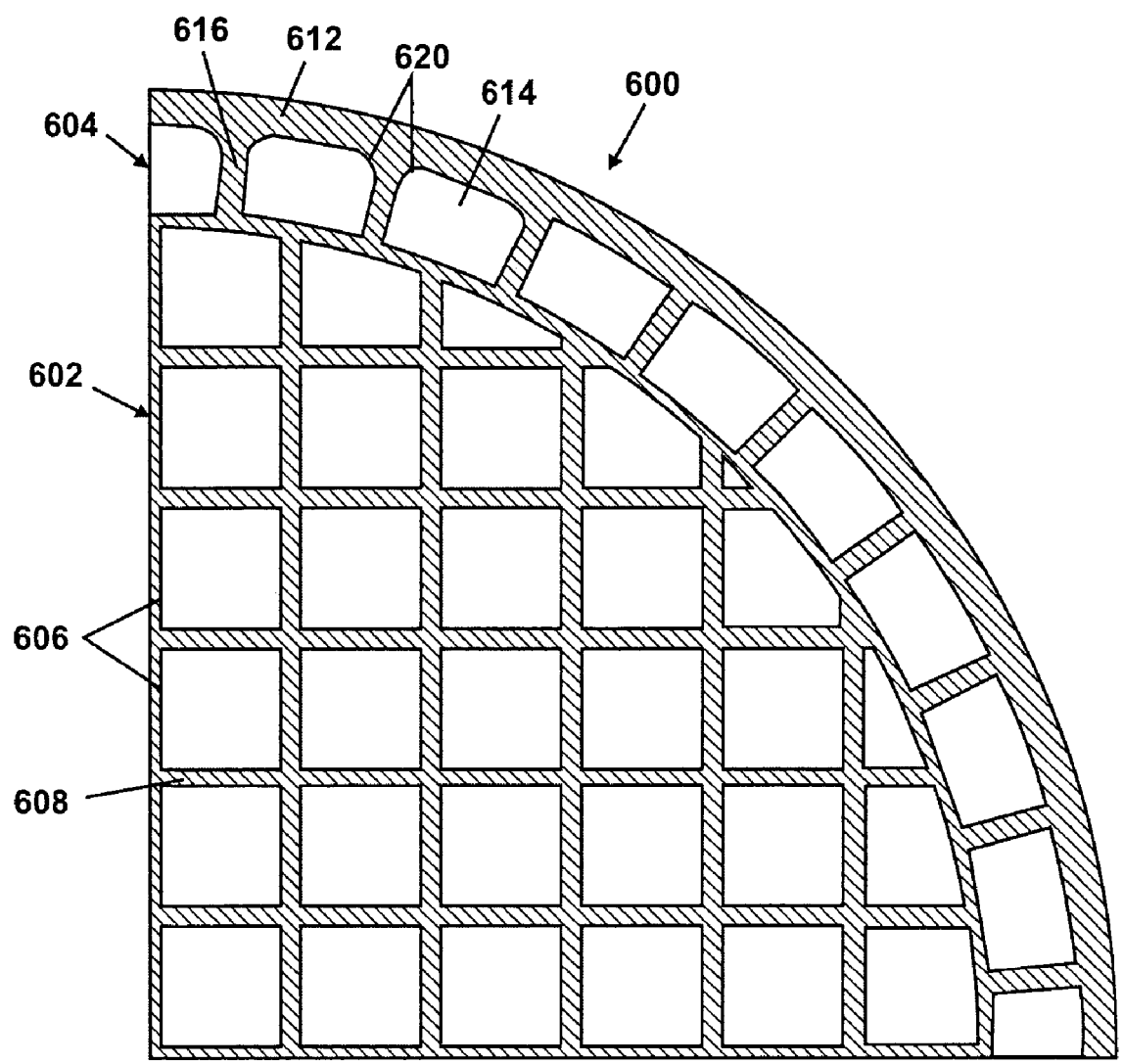
FIG. 6B shows fillets formed at junctions of the webs and outer skin of the double-skin honeycomb substrate shown in FIG. 6A.

In a manner similar to the one described for the other embodiments, more than a single layer of quadrilateral cells 614 satisfying the conditions above can be formed between the inner and outer skins 610, 612. Referring to FIG. 6B, concave fillets 620 are formed at the intersections between the straight webs 616 and the outer skin 612 to reduce stress concentration at these intersections. The fillets 620 are shown at only a few intersections for illustration purposes. In general, a portion or all of the intersections may be filleted. Further, some or all of the concave fillets 620 may be replaced with convex fillets to improve adherence of the straight webs 616 to the outer skin 612. In one embodiment, the radius of the fillets 620 could range from 0.05 to 0.2 mm for a double-skin honeycomb substrate satisfying equations (3) through (8).

Table 1 below shows radial displacement for four examples (Wagon-1 through Wagon-4) of the double-skin honeycomb substrate structure shown in FIG. 6A under a uniform pressure of 1 MPa.

TABLE 1

| Design | Geometric Variables | Radial Displacement (μm) of Outer Skin 30°–60° Orientation (Approximation by Averaging) |
| --- | --- | --- |
| Square (Reference) | 600 cells, t1 = 0.15 mm, L1 = 1 mm | 4.97 |
| Wagon-1 | L2/L1 = 0.95, L3/L1 = 1.15 t2 = t3 = t4 = 2t1 | 4.87 |
| Wagon-2 | L2/L1 = 0.95, L3/L1 = 0.725 t2 = t3 = t4 = 2t1 | 4.78 |
| Wagon-3 | L2/L1 = 0.5, L3/L1 = 1.15 t2 = t3 = t4 = 2t1 | 4.70 |
| Wagon-4 | L2/L1 = 0.5, L3/L1 = 0.5 t2 = t4 = t1, t3 = 1.25t1 | 4.81 |

Figure 7A:
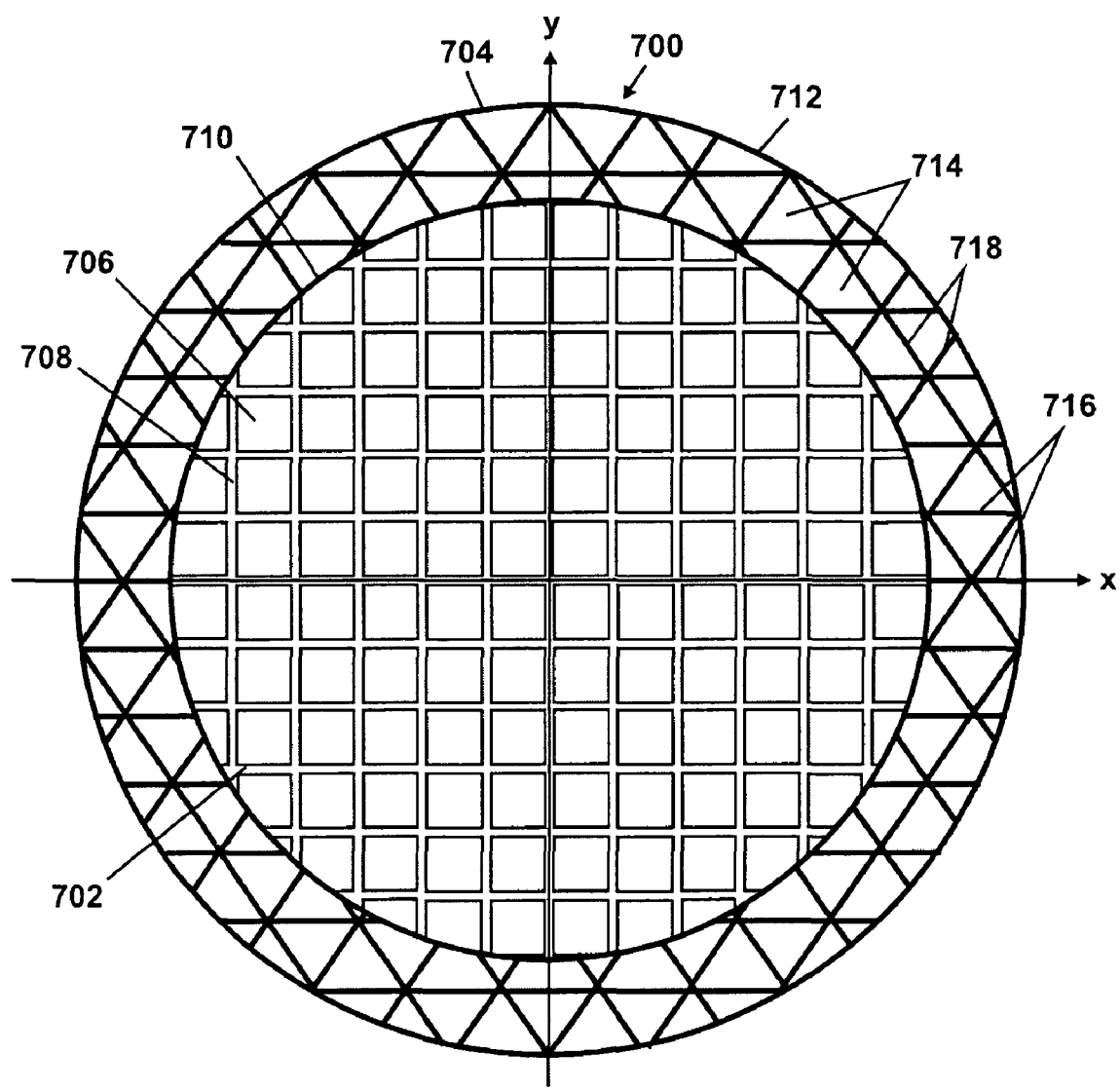
FIG. 7A is a cross-section of a double-skin honeycomb substrate having triangle cells formed by crisscrossed and straight webs between concentric skins at the periphery of the substrate according to another embodiment of the invention.

FIG. 7A shows a cross-section of a honeycomb substrate 700 according to another embodiment of the invention. The honeycomb substrate includes an inner honeycomb body 702 and an outer honeycomb body 704. In one embodiment, the inner honeycomb body 702 includes inner square cells 706 defined by inner square webs 708 and bounded by an inner skin 710. The outer honeycomb body 704 includes outer triangle cells 714. The outer triangle cells 714 are formed by a first set of outer webs 716, which are parallel to a diametrical axis x of the substrate 700, and a second set of outer webs 718, which are arranged in a crisscross pattern. The diametrical axis x is perpendicular to a side of the square cell 706. The webs 716, 718 intersect to form the triangle cells 714. The triangle cells 714 are concentric with the inner honeycomb body 702 but do not exhibit the radial orientation described for the other embodiments. The density of the triangle cells 714 and the geometry of the webs 716, 718 and angle of intersection of the webs 716, 718 can be selected to achieve desired isostatic strength for the honeycomb substrate.

Figure 7B:
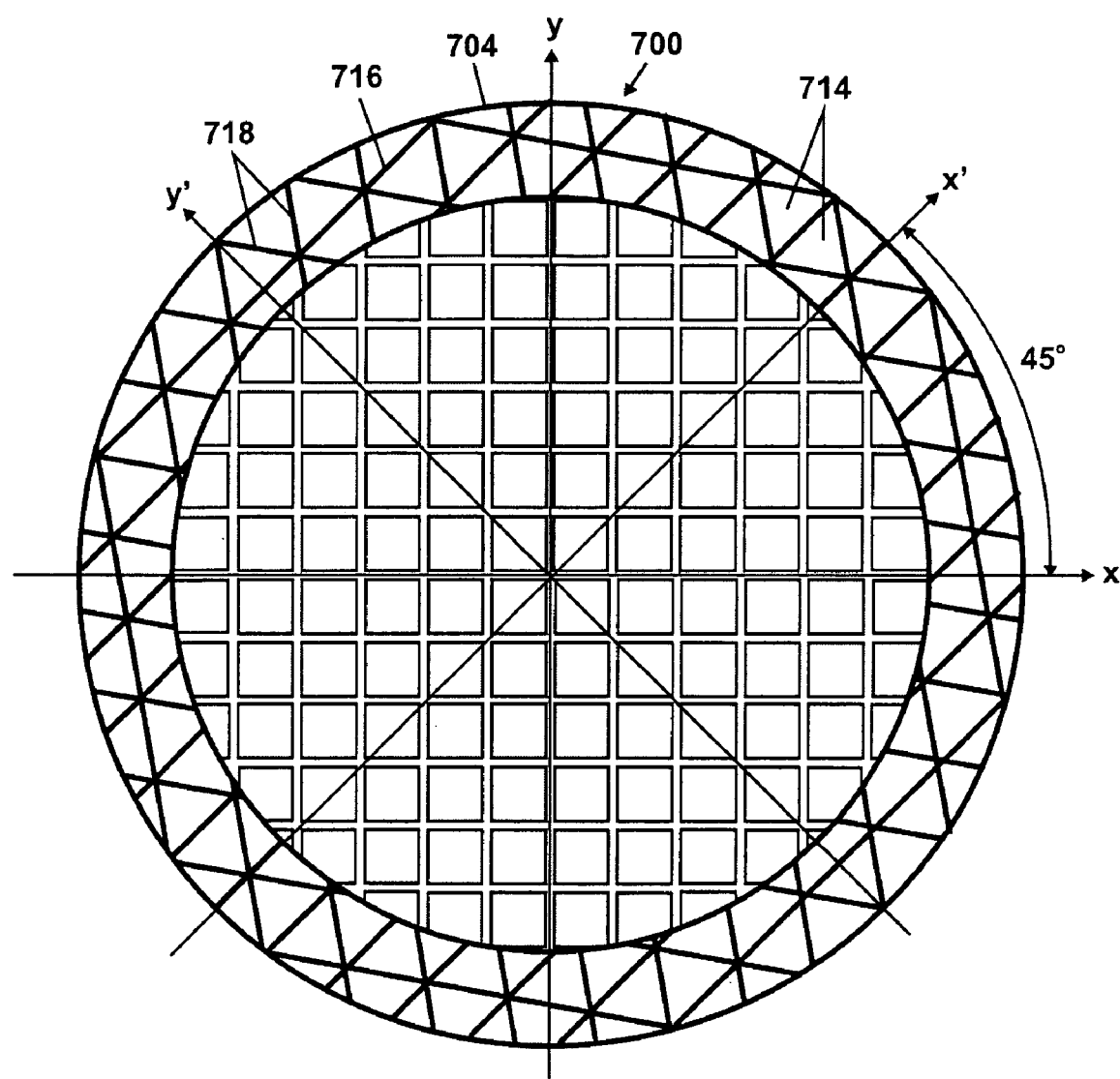
FIG. 7B shows the triangle cell structure of FIG. 7A rotated 45° about the center of the honeycomb substrate.

The outer honeycomb body 704 can be rotated 45°, as shown in FIG. 7B, to strengthen the weakest spots in the inner square structure. One or more layers of the triangle cells 714 can be used to further enhance the isostatic strength of the honeycomb substrate. In one embodiment, the thickness of the webs 716, 718 is greater than 0.5 times the thickness of the square web 708, and a length (or altitude) of the triangle cell 714 is less than 2 times a length of the square cell 706.

Figure 8A:
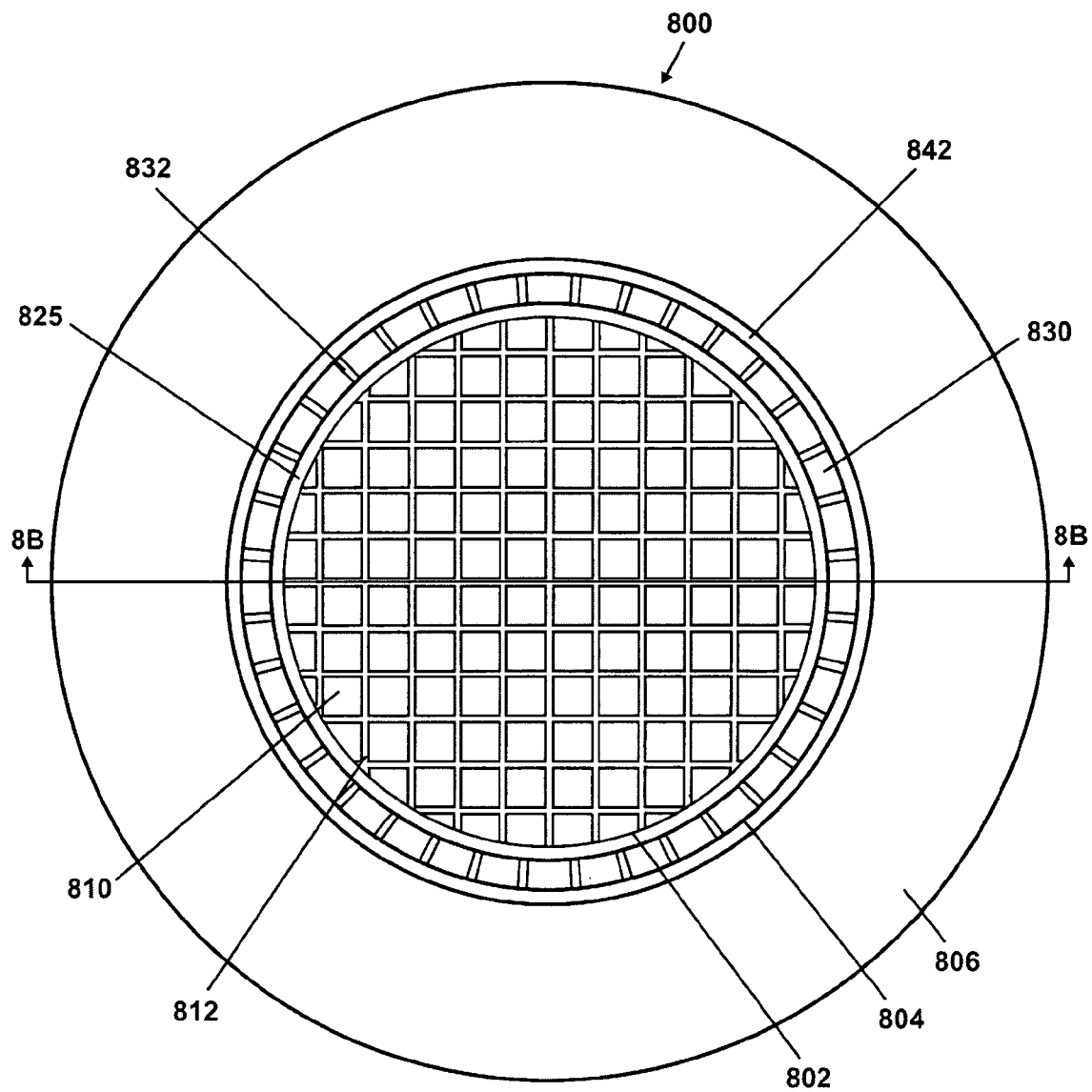
FIG. 8A is a top view of an extrusion die assembly for forming a double-skin honeycomb substrate with a single layer of cells arranged between concentric skins according to one embodiment of the invention.

FIG. 8A shows a plan view of an extrusion die assembly 800 according to an embodiment of the invention. The extrusion die assembly 800 can be used to make a double-skin honeycomb substrate having an array of inner cells defined by an array of inner webs and an array of outer cells defined by an array of outer webs, wherein the inner cells and webs are bounded by an inner skin and the outer cells and webs are bounded by the inner skin and an outer skin, wherein the outer skin is concentric with the inner skin. The extrusion die assembly 800 includes an inner cell forming die 802, an outer cell forming die 804, and a skin forming mask 806. The inner cell forming die 802 is used to form the inner webs that define the inner cells. The inner cell forming die 802 and the outer cell forming die 804 cooperate to define the shape and thickness of the inner skin. The outer cell forming die 804 is used to form the outer webs that define the outer cells. The outer cell forming die 804 and the skin forming mask 806 cooperate to define the shape and thickness of the outer skin. A single outer cell forming die 804 can be used to form a single layer of outer cells between the inner skin and the outer skin or, as will be described later, multiple outer cell forming dies can be used to form multiple layers of outer cells between the inner skin and the outer skin of the honeycomb substrate.

Figure 8B:
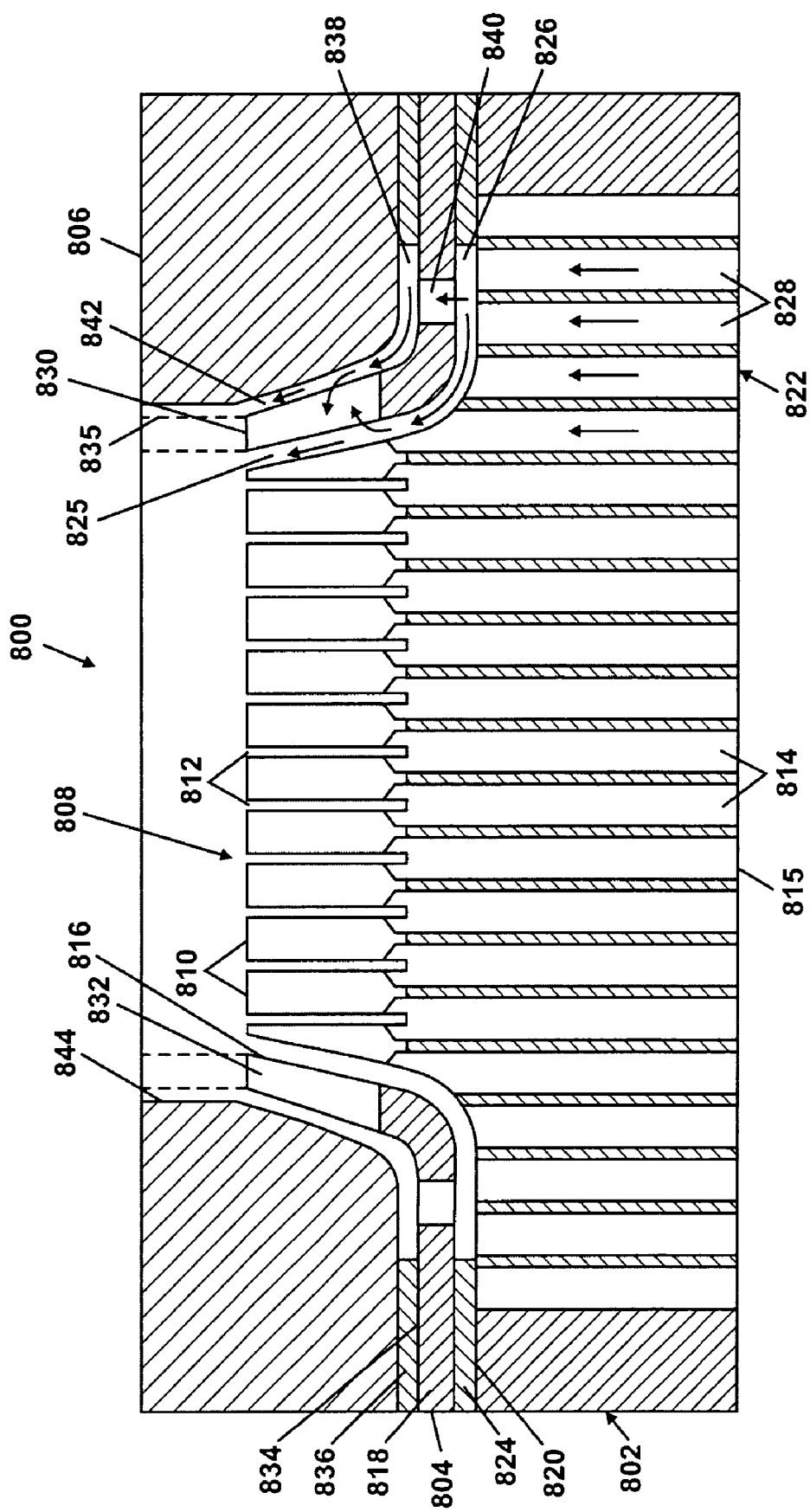
FIG. 8B is a cross-section of the extrusion die assembly shown in FIG. 8A.

FIG. 8B shows a vertical cross-section of the extrusion die assembly 800. In this figure, the inner cell forming die 802 has a central region 808. An array of (inner) slots 812 is cut in the central region 808 to define an array of (inner) pins 810. In operation, batch material is extruded through the inner slots 812 to form the inner webs of the honeycomb substrate. In one embodiment, the transverse cross-section of the inner pins 810 is square (see FIG. 8A). In general, the transverse cross-section of the inner pins 810 can be any shape common to honeycomb structures, e.g., triangle and hexagon. The central region 808 of the inner cell forming die 802 further includes an array of (inner) feedholes 814, which extend from an inlet face 815 of the die to the array of inner slots 812. The inner feedholes 814 supply batch material to the inner slots 812. The size and location of the inner feedholes 814 relative to the inner slots 812 are selected to achieve desired rate of flow through the inner slots 812. As an example, an inner feedhole 814 may correspond to each or every other inner slot 812 or may correspond to each or every other intersection of the slots 812.

The inner cell forming die 802 also includes a peripheral region 822 formed contiguous with the central region 808. The peripheral region 822 provides a mounting surface 820 for the outer cell forming die 804 and includes feedholes 828 for feeding batch material to spaces around and in the outer cell forming die 804. The outer cell forming die 804 includes an annular body 816 which terminates in an annular flange 818. The annular flange 818 is mounted on the mounting surface 820 provided by the peripheral region 822. In one embodiment, a shim 824 is interposed between the mounting surface 820 and the annular flange 818 to define an inner skin reservoir 826 between the peripheral region 822 and the annular flange 818. The feedholes 828 in the peripheral region 822 supply batch material to the inner skin reservoir 826. The annular body 816 is radially spaced from the central region 808 to define an inner skin slot 825, and the inner skin slot 825 is in communication with the inner skin reservoir 826. Batch material is extruded through the inner skin slot 825 to form the inner skin of the honeycomb substrate.

Figure 8C:
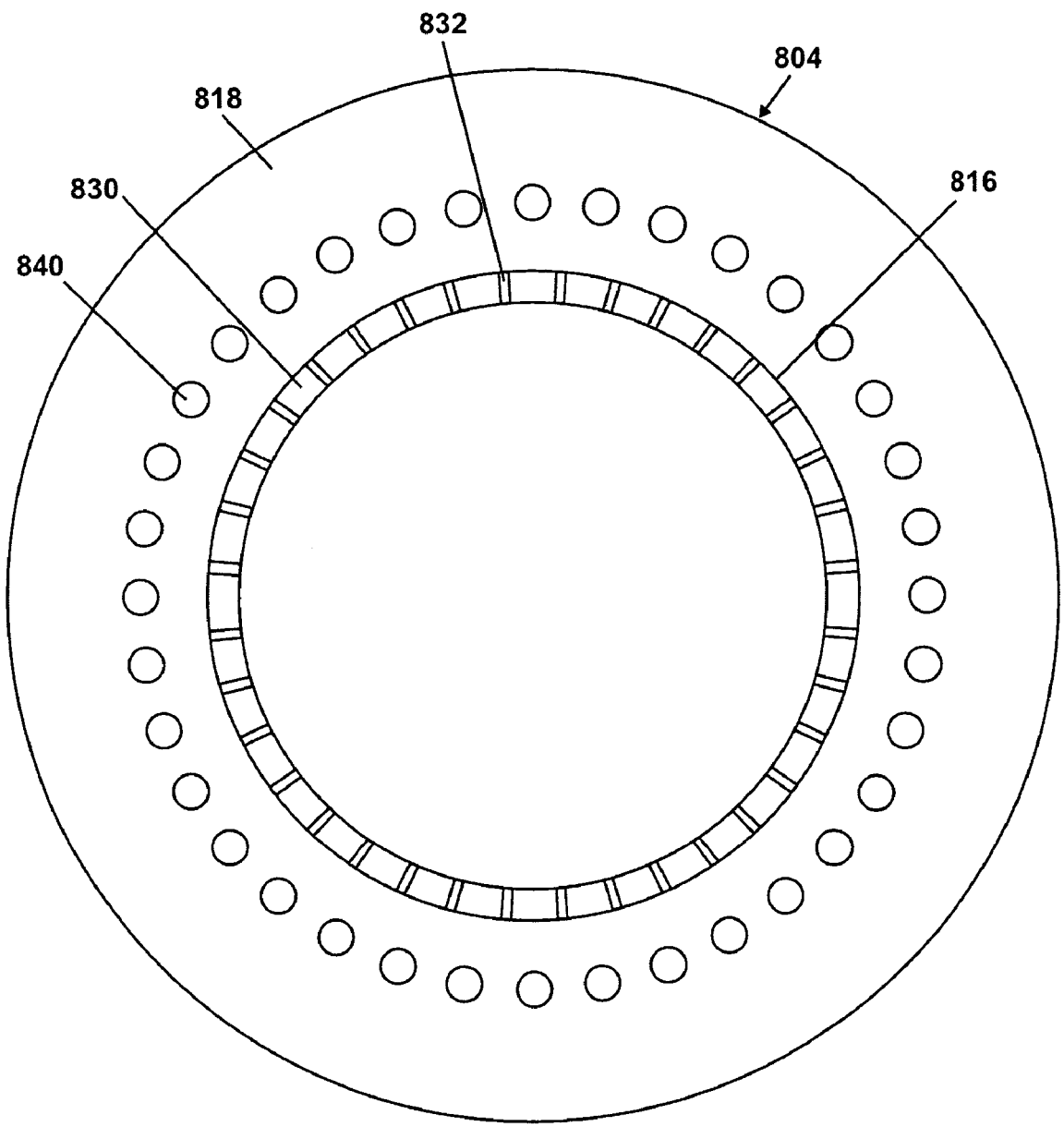
FIG. 8C is a plan view of the outer cell forming die included in the extrusion die assembly of FIG. 8A.

Referring to FIG. 8C, an array of (outer) slots 832 is cut in the annular body 816 to form a plurality of (outer) pins 830. Batch material fills the outer slots 832 to form the outer webs of the honeycomb substrate. In one embodiment, the outer pins 830 are radially-oriented with respect to the center of the inner cell forming die (802 in FIG. 8A) so as to allow radially-oriented cells to be formed between the inner and outer skins of the honeycomb substrate. The transverse cross-section of the outer pins 830 may be quadrilateral, such as shown in the figure, or may have other shape, such as triangle or diamond. Returning to FIG. 8B, the upper end of the outer pins 830 may be flush with the upper end of the inner cell forming die 802 or may be extended partly or all the way up to the top of the skin forming mask 806, as indicated by the dotted line 835.

Figure 8D:
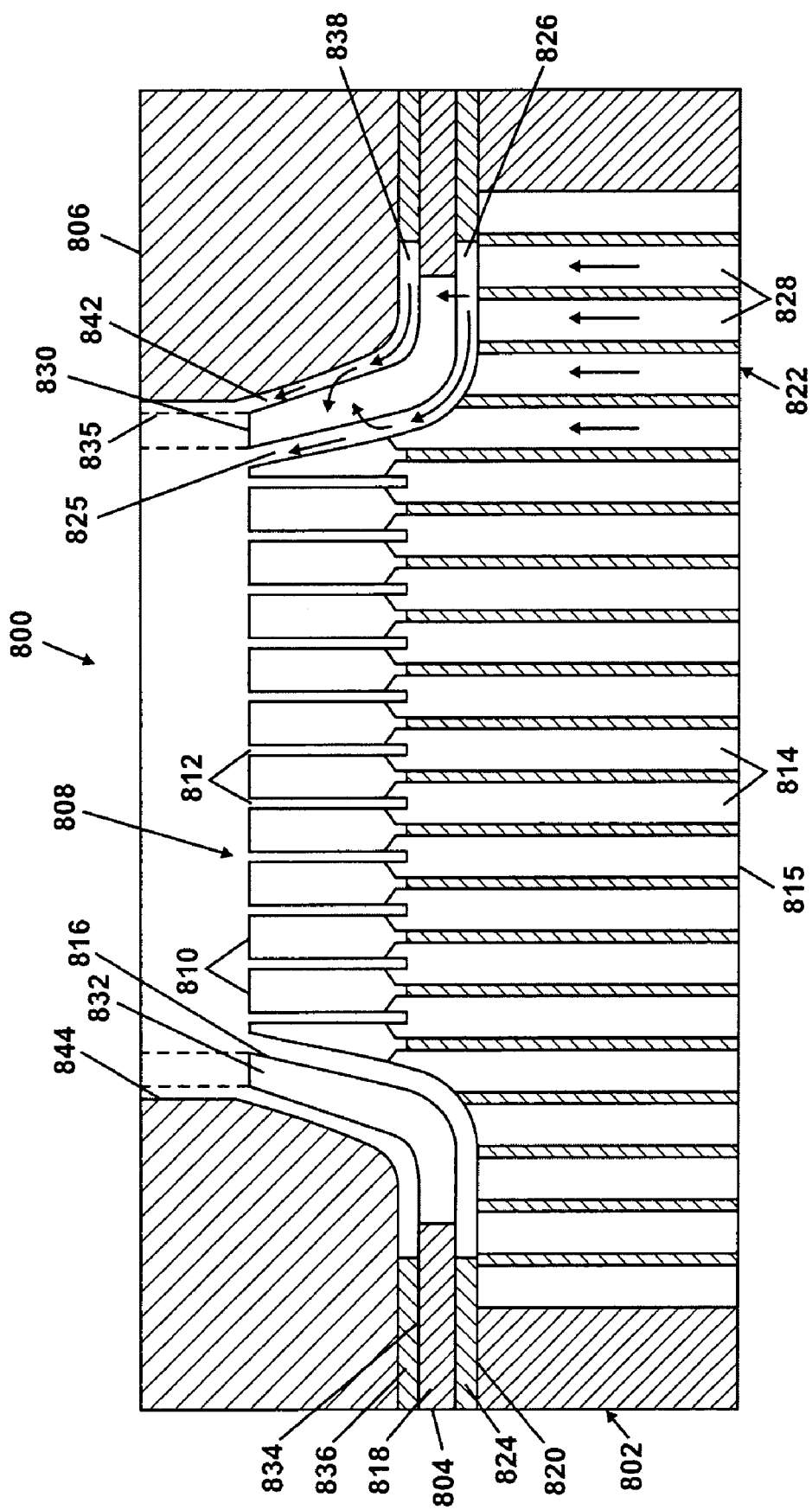
FIG. 8D is a cross-section of the extrusion die assembly of FIG. 8A according to another embodiment of the invention.

The skin forming mask 806 is mounted on a mounting surface 834 provided by the annular flange 818 of the outer cell forming die 804. In one embodiment, a shim 836 is interposed between the outer cell forming die 804 and the skin forming mask 806 to define an outer skin reservoir 838. In one embodiment, the annular flange 818 includes a plurality of orifices 840 (see also FIG. 8C) which provide communication between the inner skin reservoir 826 and the outer skin reservoir 838. The orifices 840 could be holes or slots. The orifices 840 may provide a normal or an emergency flow path between the inner and outer skin reservoirs 826, 838. In the alternate embodiment shown in FIG. 8D, one or more of the outer slots 832 in the annular body 816 are extended radially to the annular flange 818 area to provide a flow path between the inner skin reservoir 826 and the outer skin reservoir 838. Returning to FIG. 8B, the skin forming mask 806 is radially spaced from the annular body 816 to define an outer skin slot 842, which is in communication with the outer skin reservoir 838 and the outer slots 832. Batch material is extruded through the outer skin slot 842 to form the outer skin of the honeycomb substrate.

In one embodiment, two flow paths are defined between the inner skin reservoir 826 and the outer slots 832: one flow path runs from the inner skin reservoir 826 to the inner skin slot 825 to the outer slots 832, and the other flow path runs from the inner skin reservoir 826 through the orifices 840 in the annular flange 816 to the outer skin reservoir 838 to the outer skin slot 842 to the outer slots 832. Either or both of these flow paths can be used to supply extrudable material to the outer slots 832. Preferably, the flow velocity in the outer slots 832 increases gradually from the inner skin slot 825 to the outer skin slot 842. The width of the outer skin slot 842 can be selected to be different from that of the inner skin slot 825 such that flow from the outer skin slot 842 into the outer slots 832 is restricted relative to flow from the inner skin slot 825 into the outer slots 832. The flow characteristics in the inner and outer skin reservoirs 826, 838 can also be controlled to achieve desired flow velocities in the inner and outer skin slots 825, 842 which will result in the desired flow profile in the outer slots 832.

In operation, batch material is fed into the feedholes 814, 828 in the inner cell forming die 802. The batch material is extruded through the inner slots 812, the inner skin slot 825, the outer slots 832, and the outer skin slot 842. The extruded structure exits the extrusion die assembly 800 through the annular opening 844 in the skin forming mask 806. The volume of the batch material in the inner skin reservoir 826 is dependent on the extent of the radial overhang of the annular flange 818 over the inner skin reservoir 826, and the volume of the batch material in the outer skin reservoir 838 is dependent on the extent of the radial overhang of the skin forming mask 806 over the outer skin reservoir. The rate of flow of the batch material through the feedholes 828 and the orifices 840 and the volume of the inner and outer skin reservoirs 826, 838 determine the character of the inner skin, outer webs, and outer skin of the honeycomb substrate. The rate of flow of batch material through the feedholes 814 feeding the inner slots 812 may be controlled independently of the rate of flow of batch material through the feedholes 828 feeding the inner skin slot 825, the outer slots 832, and the outer skin slot 842.

Figure 8E:
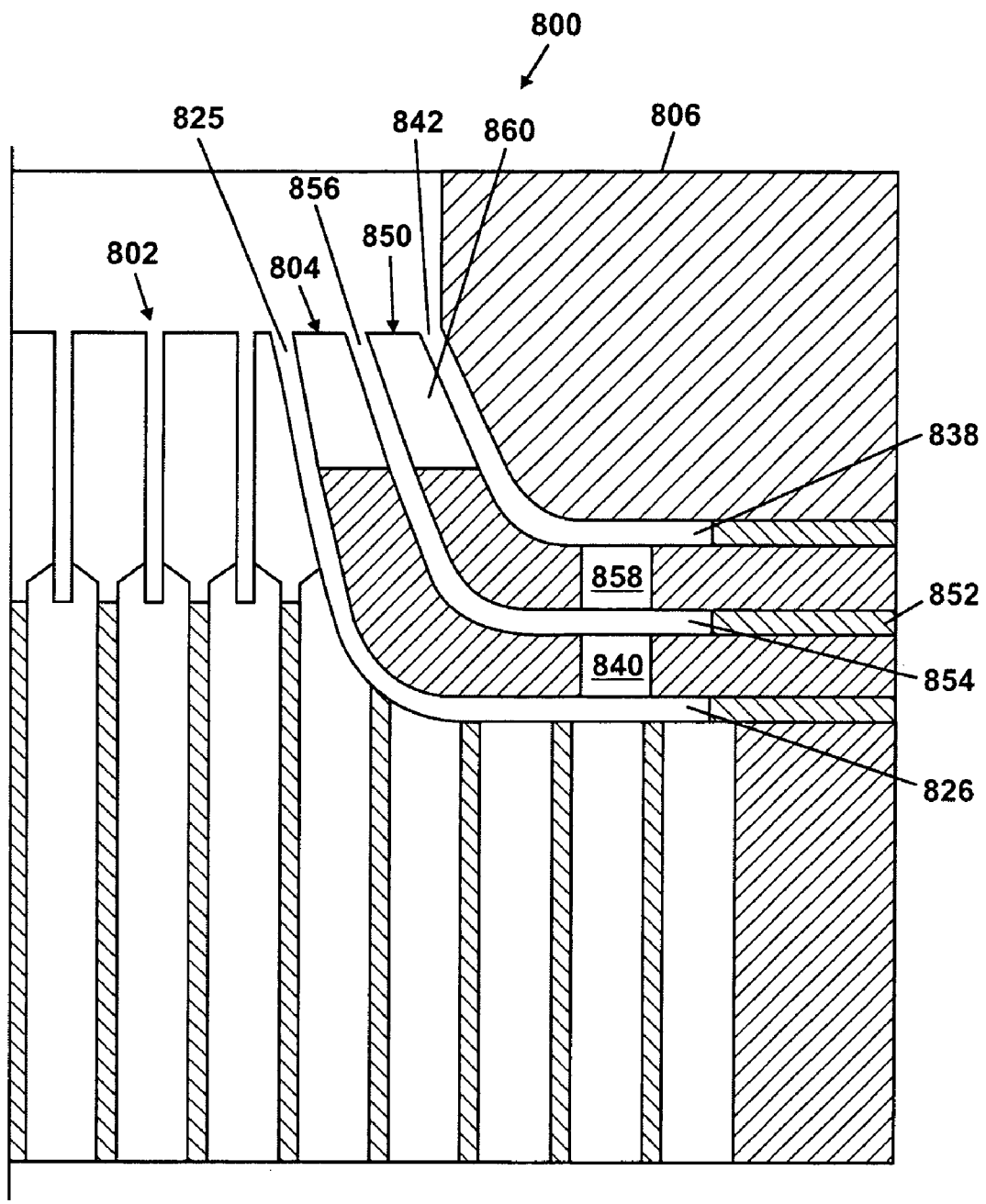
FIG. 8E is a partial cross-section of an extrusion die assembly for forming a double-skin honeycomb substrate with two layers of cells arranged between concentric skins according to another embodiment of the invention.

FIG. 8E shows the extrusion die assembly 800 modified to form a honeycomb substrate having two layers of outer cells between the inner skin and the outer skin. The modification includes interposing a second outer cell forming die 850 between the outer cell forming die 804 and the skin forming mask 806. The second outer cell forming die 850 is axially spaced from the first outer cell forming die 804 by a shim 852. An intermediate skin reservoir 854 is defined between the first and second outer cell forming dies 804, 850 and the shim 852. The second outer cell forming die 850 is radially spaced from the outer cell forming die 804 to form an intermediate skin slot 856, which is in communication with the intermediate skin reservoir 854, which is in communication with the inner skin reservoir 826 through the orifices 840 in the outer cell forming die 804. The outer skin slot 842 is now defined between the second outer skin forming die 850 and the skin forming mask 806. The second outer skin forming die 850 include orifices 858 which allow communication between the intermediate skin reservoir 854 and the outer skin reservoir 838. The second outer cell forming die 850 includes slots 860 for forming the second layer of outer cells. The intermediate skin slot 856 is used in forming the intermediate skin that separates the first layer of outer cells formed by the outer cell forming die 804 from the second layer of outer cells formed by the second outer cell forming die 850. More than two outer cell forming dies may be interposed between the inner cell forming die 802 and the skin forming mask 806 to form more than two layers of cells between the inner skin and the outer skin of the honeycomb substrate.

Figure 8F:
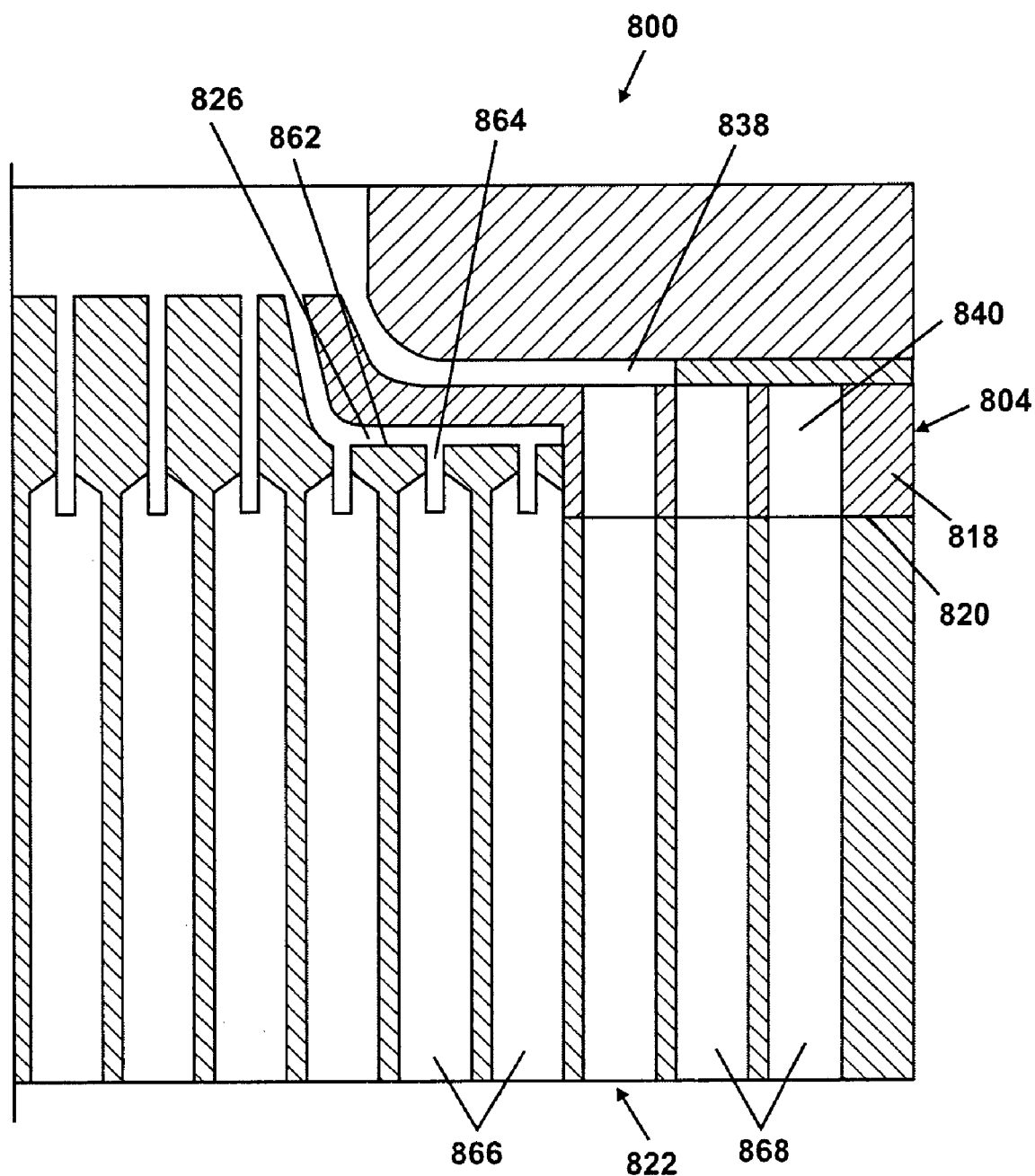
FIG. 8F is a partial cross-section of an extrusion die assembly according to another embodiment of the invention showing an alternate means of supplying batch material to an inner skin reservoir and an outer skin reservoir.

Other modifications that can be made to the extrusion die assembly 800 include changing the flow path of batch material from the feedholes in the peripheral region to the inner skin slot, outer slots, and outer skin slot. For example, FIG. 8F shows the peripheral region 822 modified to include an array of peripheral pins 862, which define an array of peripheral slots 864. The peripheral region 822 includes a first set of feedholes 866 in communication with the peripheral slots 864. The peripheral region 822 also includes a second set of feedholes 868 which open to the mounting surface 820 for the outer cell forming die 804. The inner skin reservoir 826 is defined between the portion of the peripheral region 822 containing the peripheral slots 864 and the corresponding portion of the outer cell forming die 804. The inner skin reservoir 826 is in communication with the first set of feedholes 866 through the peripheral slots 864. The second set of feedholes 868 are in direct communication with the orifices 840 in the annular flange 818 of the outer cell forming die 804. The orifices 840 are in turn in communication with the outer skin reservoir 838. This arrangement allows independent control of the flow of batch material into the inner and outer skin reservoirs 826, 838. If desired, a shim reservoir may be formed between the second set of feedholes 868 and the orifices 840 in the annular flange 818.

The extrusion die assembly described above can be manufactured using existing methods for making extrusion dies. The inner cell forming die can be made by machining holes in a lower portion of a block that is made of a machinable material. These holes would serve as feedholes. A process such as wire electrical discharge machining (EDM) can be used to cut the extrusion slots in the upper portion of the block. Pins remain on the upper portion of the block after the slots are cut. The pins at the periphery of the block can be shortened or completely removed. The outer cell forming die can be made in a similar manner. The extrusion slots made in the outer cell forming die could have any of the geometries described in conjunction with the double-skin honeycomb substrates above or may have other geometries.

The invention provides one or more advantages. The invention provides reinforcing structures near the periphery of the honeycomb substrate that have a geometry and orientation such that the isostatic strength of the honeycomb substrate is enhanced. The reinforcing structures are separated from the inner structure of the honeycomb substrate, making it possible to optimize the geometry of the reinforcing structures without significantly perturbing the inner structure of the honeycomb substrate. In this way, the inner structure of the honeycomb substrate can be optimized to achieve a desired performance, while the reinforcing structures can be designed to provide the desired isostatic strength.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. An extrusion die assembly for making a double-skin honeycomb structure, comprising:
    an inner cell forming die having a central region and a peripheral region, the central region comprising an array of inner slots cut to define an array of inner pins and an array of central feedholes in communication with the array of inner slots, the peripheral region comprising an array of peripheral feedholes;
    a skin forming mask mounted coaxially with the inner cell forming die; and at least one outer cell forming die mounted coaxially with and interposed between the inner cell forming die and the skin forming mask, the outer cell forming die having an array of outer slots cut to define an array of outer pins, the outer pins being spaced radially from the central region to define an inner skin slot, the inner skin slot being in selective communication with the peripheral feedholes, the outer pins being spaced radially from the skin forming mask to define an outer skin slot, the outer skin slot being in selective communication with the peripheral feedholes through an opening in the outer cell forming die.

2. The extrusion die assembly of claim 1, further comprising an outer skin reservoir defined between the outer cell forming die and the skin forming mask.

3. The extrusion die assembly of claim 2, wherein the outer skin reservoir is in communication with the outer skin slot and the opening in the outer cell forming die.

4. The extrusion die assembly of claim 3, further comprising an inner skin reservoir defined between the inner cell forming die and the outer cell forming die.

5. The extrusion die assembly of claim 4, wherein the inner skin reservoir is in communication with the inner skin slot and the peripheral feedholes.

6. The extrusion die assembly of claim 4, wherein the inner skin reservoir is in communication with the outer skin reservoir through the opening in the outer cell forming die.

7. The extrusion die assembly of claim 5, wherein a volume of the inner skin reservoir relative to a volume of the outer skin reservoir is such that flow velocity in the outer slots gradually increases from the inner skin slot to the outer skin slot.

8. The extrusion die assembly of claim 1, wherein the opening comprises a plurality of orifices.

9. The extrusion die assembly of claim 1, wherein the opening comprises a radial extension of the outer slots.

10. The extrusion die assembly of claim 1, wherein the outer pins are oriented radially with respect to a center of the inner cell forming die.

11. The extrusion die assembly of claim 10, wherein the inner pins have a square cross-section.

12. The extrusion die assembly of claim 10, wherein the array of outer pins comprises pins having a triangle cross-section.

13. The extrusion die assembly of claim 10, wherein the array of outer pins comprises pins having a diamond cross-section.

14. The extrusion die assembly of claim 10, wherein the outer pins have a quadrilateral cross-section.

15. The extrusion die assembly of claim 1, wherein a plurality of outer cell forming dies are interposed between the inner cell forming die and the skin forming mask.

16. The extrusion die assembly of claim 15, wherein an intermediate skin slot is defined between adjacent outer cell forming dies.

* * * * *